(12) United States Patent
Chen

(10) Patent No.: US 11,493,837 B2
(45) Date of Patent: Nov. 8, 2022

(54) OPTICAL DEVICE

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 63 days.

(21) Appl. No.: 16/789,344

(22) Filed: Feb. 12, 2020

(65) Prior Publication Data

US 2020/0264497 A1 Aug. 20, 2020

(30) Foreign Application Priority Data

Feb. 15, 2019 (CN) .......................... 201920199876.1

(51) Int. Cl.
*G03B 21/14* (2006.01)
*G09G 3/00* (2006.01)

(52) U.S. Cl.
CPC ........... *G03B 21/145* (2013.01); *G09G 3/007* (2013.01)

(58) Field of Classification Search
CPC ..... G03B 21/00–64; H04N 9/31–3197; G09G 3/007
See application file for complete search history.

(56) References Cited

U.S. PATENT DOCUMENTS

| 2008/0304017 | A1* | 12/2008 | Chen | ..................... G02B 27/46 353/30 |
| 2014/0036239 | A1* | 2/2014 | Mash | ................. G02B 26/0841 353/81 |
| 2017/0323815 | A1* | 11/2017 | Kuenanz | ................. C23C 14/34 |
| 2019/0278102 | A1* | 9/2019 | Suter | .................... G02B 27/646 |

FOREIGN PATENT DOCUMENTS

| CN | 105467726 | 4/2016 |
| TW | 201816502 | 5/2018 |

* cited by examiner

*Primary Examiner* — Christopher A Lamb, II
(74) *Attorney, Agent, or Firm* — JCIPRNET

(57) ABSTRACT

An optical device including a bearing structure and a light-transmitting plate body is provided. The bearing structure includes a first frame body and a second frame body connected to each other, and the first frame body is located in the second frame body. The first frame body has at least one first inner surface, and the at least one first inner surface has at least one limiting protruding portion protruding from the at least one first inner surface. The light-transmitting plate body is disposed in the first frame body and is fixed to the first frame body. The light-transmitting plate body has at least one first edge, and the at least one first edge of the light-transmitting plate body is positioned through the at least one limiting protruding portion.

17 Claims, 11 Drawing Sheets

OPTICAL DEVICE

CROSS-REFERENCE TO RELATED APPLICATION

This application claims the priority benefit of China application serial no. 201920199876.1, filed on Feb. 15, 2019. The entirety of the above-mentioned patent application is hereby incorporated by reference herein and made a part of this specification.

BACKGROUND OF THE INVENTION

Field of the Invention

The disclosure relates to an optical device, and in particular, to an optical device applicable to a projector.

Description of Related Art

A projection device is a display device for generating an image. The imaging principle of the projection device involves converting an illumination beam generated by a light source into an image beam through a light valve, and then projecting the image beam onto a screen or a wall through a lens.

The resolution of the image converted by the light valve has gradually failed to meet the market demand. In order to further improve the image resolution, a high-resolution light valve may be used in the projection device, but doing so would result in an issue of high costs of the projection device. In addition, in some projection devices, an optical device capable of optical vibration may be additionally provided to further improve the resolution of the image converted by the light valve. Such an optical device generally includes a frame body and a light-transmitting plate body disposed in the frame body, and an inner surface of the frame body located at the periphery corresponds to a side surface of the light-transmitting plate body to achieve the positioning effect. However, if the frame body is designed to position the side surface of the light-transmitting plate body through the entire inner surface, since the precision for the frame body is lower, the entire inner surface may not be a fully flat surface but may be slightly concave or convex due to the tolerance. Under such circumstances, it is difficult for a designer to accurately define the size, and positioning and assembly inconvenience of the light-transmitting plate body is likely to occur during the subsequent assembly process of the optical device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical device in which a light-transmitting plate body can be easily positioned in a frame body, which effectively avoids the assembly inconvenience resulting from an uneven surface of the frame body.

Other purposes and advantages of the invention may be further understood from the technical features recited herein.

To achieve one, part, or all of the above purposes or other purposes, an embodiment of the invention provides an optical device including a bearing structure and a light-transmitting plate body. The bearing structure includes a first frame body and a second frame body connected to each other, and the first frame body is located in the second frame body. The first frame body has at least one first inner surface, and the at least one first inner surface has at least one limiting protruding portion protruding from the at least one first inner surface. The light-transmitting plate body is disposed in the first frame body and is fixed to the first frame body. The light-transmitting plate body has at least one first edge, and the at least one first edge of the light-transmitting plate body is positioned through the at least one limiting protruding portion.

Based on the above, in the optical device of the invention, since the first frame body positions a part of the first edge of the light-transmitting plate body through the limiting protruding portion on the first inner surface rather than positions the entire first edge of the light-transmitting plate body through the entire first inner surface, the precision requirement for the first frame body may be lower, and an assembler may also operate more conveniently when assembling the light-transmitting plate body into the first frame body, which effectively avoids the assembly inconvenience resulting from the uneven surface of the frame body.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
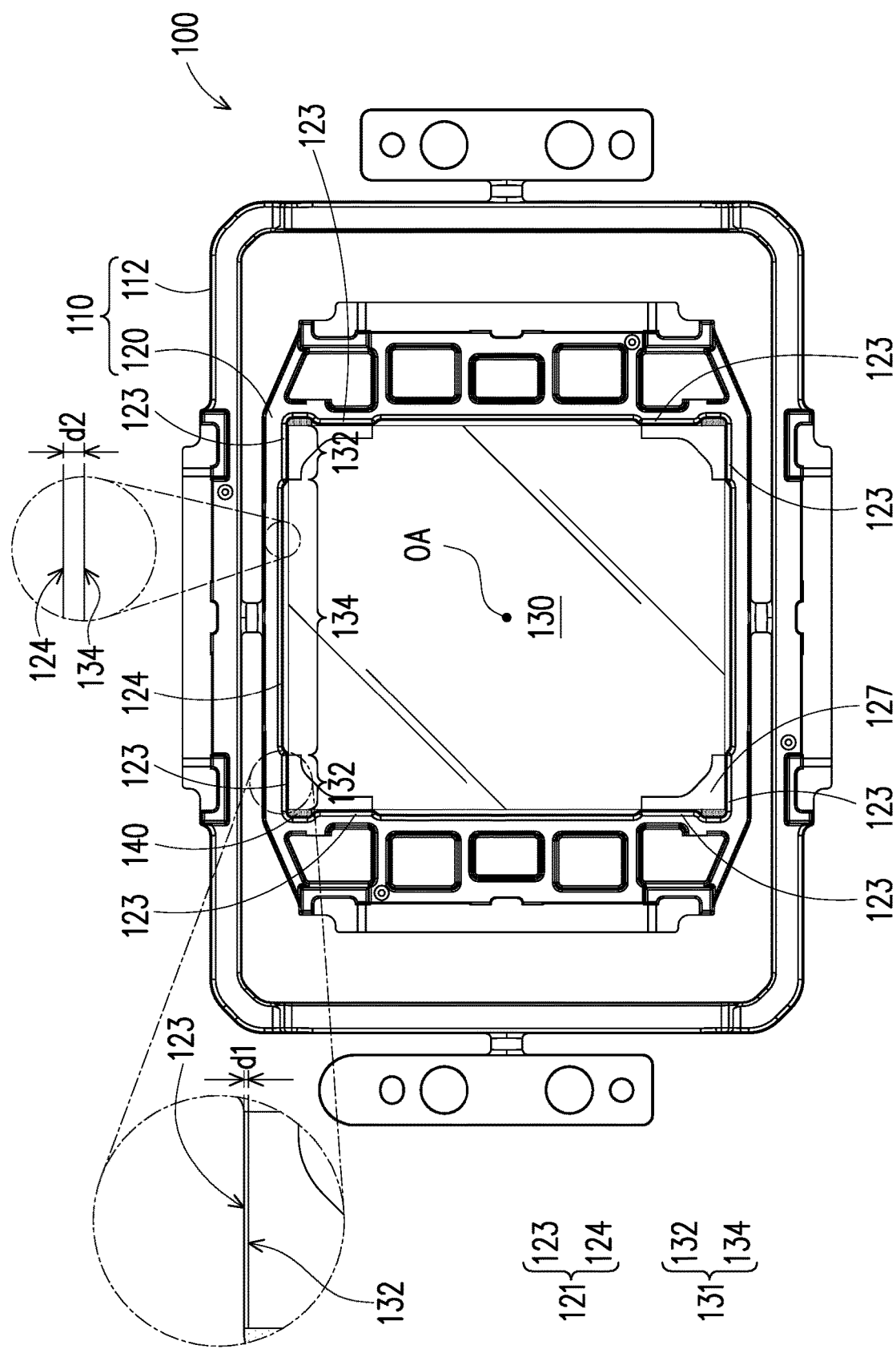
FIG. 1 is a schematic top view of an optical device according to an embodiment of the invention.
Figure 2:
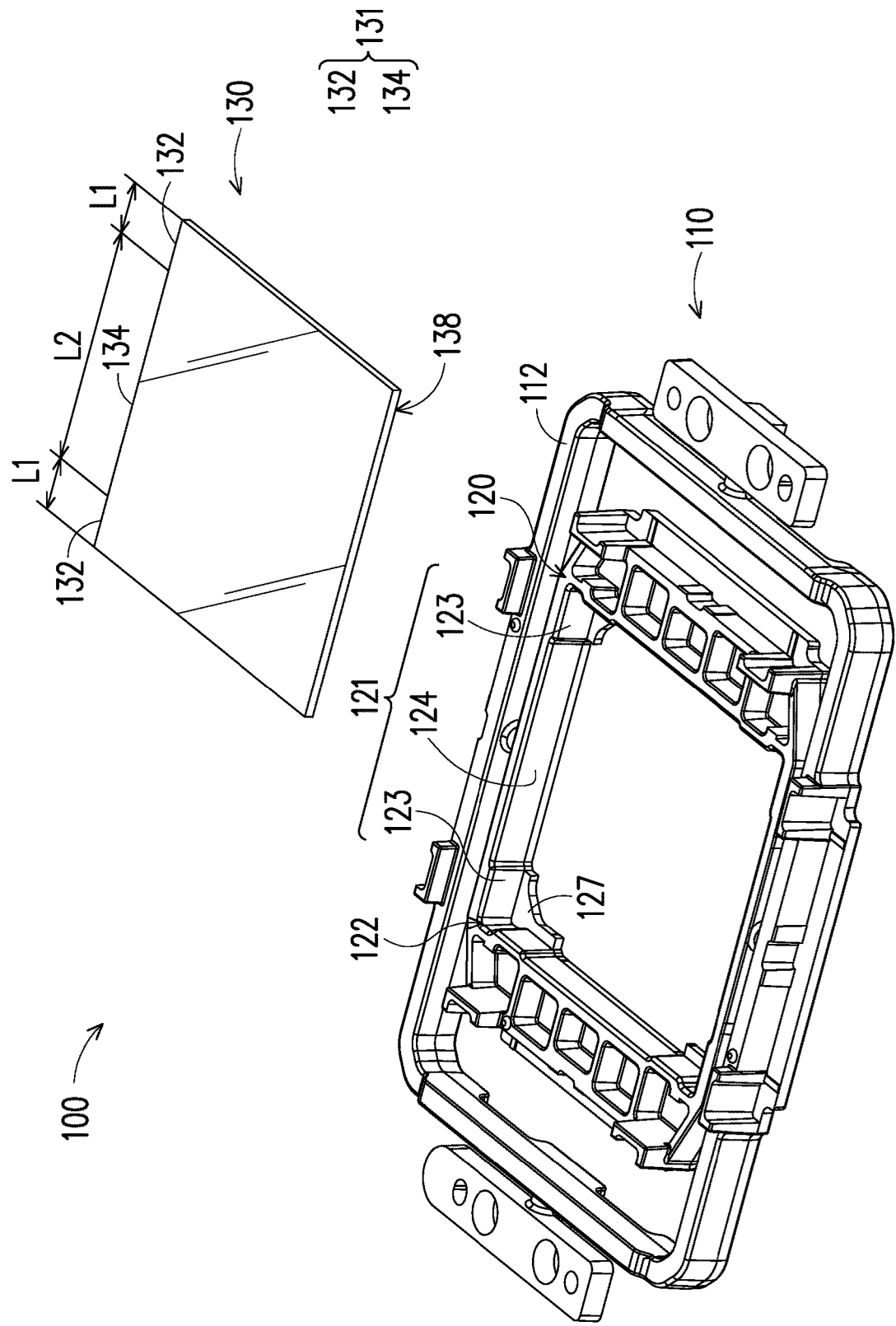
FIG. 2 is a schematic exploded view of the optical device of FIG. 1.

FIG. 1 is a schematic top view of an optical device according to an embodiment of the invention. FIG. 2 is a schematic exploded view of the optical device of FIG. 1. Referring to FIG. 1 and FIG. 2, in the present embodiment, an optical device 100 includes a bearing structure 110 and a light-transmitting plate body 130. The bearing structure 110 includes a first frame body 120 and a second frame body 112 connected to each other. The first frame body 120 is located in the second frame body 112, and the first frame body 120 may turn with respect to the second frame body 112. The light-transmitting plate body 130 is located in the first frame body 120 and is fixed to the first frame body 120. The bearing structure 110 may further include a base body (not shown), and the second frame body 112 may be pivotally connected in the base body. In some embodiments, the second frame body 112 may turn with respect to the base body, but the invention is not limited thereto. In other embodiments, the second frame body 112 may also be fixed to the base body.

In some embodiments, a driving component (not shown) may be respectively disposed on the first frame body 120 and the second frame body 112. The two driving components are, for example, a coil and a magnet. The magnetic force generated between the coil and the magnet drives a pivot shaft between the first frame body 120 and the second frame body 112 or/and a pivot shaft between the second frame body 112 and the base body to undergo reciprocating elastic deformation, such that the second frame body 112 reciprocatingly turns with respect to the first frame body 120 or/and the second frame body 112 reciprocatingly turns with respect to the base body to cause reciprocating vibration of the light-transmitting plate body 130. In some embodiments, the material of the first frame body 120 located in the second frame body 112 may be a non-magnetic body. The pivot shaft between the first frame body 120 and the second frame body 112 and the pivot shaft between the second frame body 112 and the base body may be perpendicular to each other, but the invention is not limited thereto. For example, the included angle between the pivot shaft between the first frame body 120 and the second frame body 112 and the pivot shaft between the second frame body 112 and the base body may be an acute angle. In addition, the material of the first frame body 120 or the second frame body 112 may be a metal material (e.g., aluminum or titanium), or a resin material (e.g., rubber or plastic). However, the invention is not limited to thereto.

The optical device 100 of the present embodiment is configured, for example, to be disposed on a transmission path of an image beam between a light valve and a lens of a projector to enhance the resolution of the image beam through the optical vibration technique. In other embodiments, the optical device 100 may be applied to other types of devices, and the invention is not limit thereto.

It is noted that, as shown in FIG. 1 and FIG. 2, in the present embodiment, the first frame body 120 has at least one first inner surface 121, and the light-transmitting plate body 130 has an optical axis OA. As shown in FIG. 1, the optical axis OA may be, for example, a virtual axis that passes through the center of the light-transmitting plate body 130 and is perpendicular to the plane on which the light-transmitting plate body 130 is located. For example, in some embodiments, a direction extending from the location of the optical axis OA of the light-transmitting plate body 130 toward the first inner surface 121 of the first frame body 120 may be defined as an "inward direction", and the opposite as an "outward direction". The first inner surface 121 of the first frame body 120 may be a vertical inner surface of the first frame body 120. For example, the first inner surfaces 121 may extend in a direction parallel to the optical axis OA. In some embodiments, the first frame body 120 has at least four first inner surfaces 121. In the embodiment shown in FIG. 1, each of the first inner surfaces 121 has at least one limiting protruding portion 123 that protrudes from the first inner surface 121. However, in other embodiments, the first frame body 120 may also have at least one second inner surface that is not provided with a limiting protruding portion (as detailed below). In the present embodiment, each of the first inner surfaces 121 has two limiting protruding portions 123, and a side recess portion 124 is formed between the two limiting protruding portions 123. Of course, the numbers of the first inner surfaces 121, the limiting protruding portions 123, and the side recess portions 124 are not limited thereto.

As can be seen from FIG. 1, in the present embodiment, the two limiting protruding portions 123 located on each of the first inner surfaces 121 may be respectively located on two opposite sides of the side recess portion 124 (namely, the side recess portion 124 is located between the two limiting protruding portions 123), such that the eight limiting protruding portions 123 shown in FIG. 1 may be respectively located at four corners 122 formed by the at least four first inner surfaces 121. Such a design provides better positioning of the light-transmitting plate body 130.

In addition, the light-transmitting plate body 130 has at least one first edge 131, and the at least one first edge 131 of the light-transmitting plate body 130 is positioned through the at least one limiting protruding portion 123. Each of the at least one first edge 131 includes at least one first segment 132 and at least one second segment 134. The at least one first segment 132 is aligned (opposing, opposite, or corresponding) with the at least one limiting protruding portion 123, and the at least one second segment 134 is separated from the at least one first inner surface 121 of the first frame body 120.

Specifically, in the present embodiment, the light-transmitting plate body 130 has four first edges 131, and the four first edges 131 of the light-transmitting plate body 130 form a rectangle. Each of the first edges 131 includes two first segments 132 corresponding to the two limiting protruding portions 123 and one second segment 134 corresponding to the side recess portion 124, and the second segment 134 is located between the two first segments 132.

As shown in FIG. 1, in the present embodiment, a distance d1 between the two first segments 132 and the corresponding two limiting protruding portions 123 is both smaller than a distance d2 between the second segment 134 and the bottom of the corresponding side recess portion 124. In the present embodiment, since the light-transmitting plate body 130 is bonded to the first frame body 120 through, for example, an adhesive at the four corners 122, it is possible that the limiting protruding portion 123 of the first frame body 120 is not in direct contact with the first segment 132 of the at least one first edge 131 of the light-transmitting plate body 130. In other words, an adhesive for bonding the light-transmitting plate body 130 to the first frame body may be present between the limiting protruding portion 123 of the first frame body 120 and the first segment 132 of the at least one first edge 131 of the light-transmitting plate body 130. Therefore, in the embodiment shown in FIG. 1, the distance d1 between the first segment 132 and the corresponding limiting protruding portion 123 is not zero. However, in other embodiments, the distance d1 between the first segment 132 and the corresponding limiting protruding portion 123 may be changed by changing the position of the adhesive. For example, in the case where no adhesive is present between the first segment 132 and the corresponding limiting protruding portion 123, the distance d1 may also be zero.

Further, as shown in FIG. 2, in the present embodiment, a length L2 of the second segment 134 is greater than a length L1 of the first segment 132, and the length L2 of the second segment 134 is greater than a sum of the lengths L1 of the two first segments 132. In other words, in the first inner surface 121 of the first frame body 120, the proportion of the limiting protruding portion 123 is less than half. Of course, the length relationship between the first segment 132 and the second segment 134 is not limited thereto. For example, in other embodiments, the lengths L1 of the two first segments 132 of one of the at least one first edge 131 may be the same (as shown in FIG. 1) or may also be different.

In the present embodiment, since the first frame body 120 positions a part of the first edge 131 of the light-transmitting plate body 130 through the limiting protruding portion 123 on the first inner surface 121 rather than positions the entire first edge 131 of the light-transmitting plate body 130 through the entire first inner surface 121, the precision requirement for the first inner surface 121 of the first frame body 120 may be lower, and an assembler may also operate more conveniently when assembling the light-transmitting plate body 130 into the first frame body 120, which effectively avoids the assembly inconvenience resulting from the uneven surface of the frame body.

In addition, as can be seen from FIG. 2, the light-transmitting plate body 130 has a surface 138. The surface 138 may be a light incident surface or a light exit surface. The first frame body 120 further includes at least one surface bearing portion 127. The at least one surface bearing portion 127 extends from the at least one first inner surface 121 of the first frame body 120 toward the center of the first frame body 120, and the surface 138 of the light-transmitting plate body 130 is at least partially supported by the at least one surface bearing portion 127 of the first frame body 120. Additionally, the at least one surface bearing portion 127 may be aligned with the at least one first segment 132 of the at least one first edge 131.

More specifically, in the present embodiment, the first frame body 120 includes four surface bearing portions 127. Each of the surface bearing portions 127 extends inwardly from two adjacent first inner surfaces 121 (i.e., at the corner 122). Each of the surface bearing portions 127 is aligned with two of the first segments 132 of two of the first edges 131 of the light-transmitting plate body 130. The light-transmitting plate body 130 is supported on the four surface bearing portions 127 at the four corners (i.e., the eight first segments 132 of the four first edges 131 of the light-transmitting plate body 130), which can thus provide secure fixing effect. Of course, the number and positions of the surface bearing portions 127 of the first frame body 120 and their relative positions with respect to the light-transmitting plate body 130 are not limited thereto.

In an embodiment, the light-transmitting plate body 130 may be a glass component. For example, the light-transmitting plate body 130 may be a glass plate having a thickness less than or equal to 5 mm. The material of the light-transmitting plate body 130 includes various glass materials such as borosilicate glass, quartz glass, etc. In some embodiments, the light-transmitting plate body 130 includes a material that is light transmissive and refracts light, such as a high-temperature resistant optical plastic material. In other embodiments, the light-transmitting plate body 130 may also be various crystalline materials such as crystal, sapphire, etc. In the present embodiment, the light-transmitting plate body 130 may be connected to the first frame body 120 of the bearing structure 110 through an adhesive 140. In other embodiments, the light-transmitting plate body 130 may also be fixed to the first frame body 120 of the bearing structure 110 through lock-fixing, pressing by an elastic piece, or another method.

Other forms of the optical device will be described below. In the following embodiments, elements that are the same as or similar to those of the above embodiment will be labeled with the same or similar numerals and will not be repeatedly described. Only the main differences therebetween will be described.

Figure 3A:
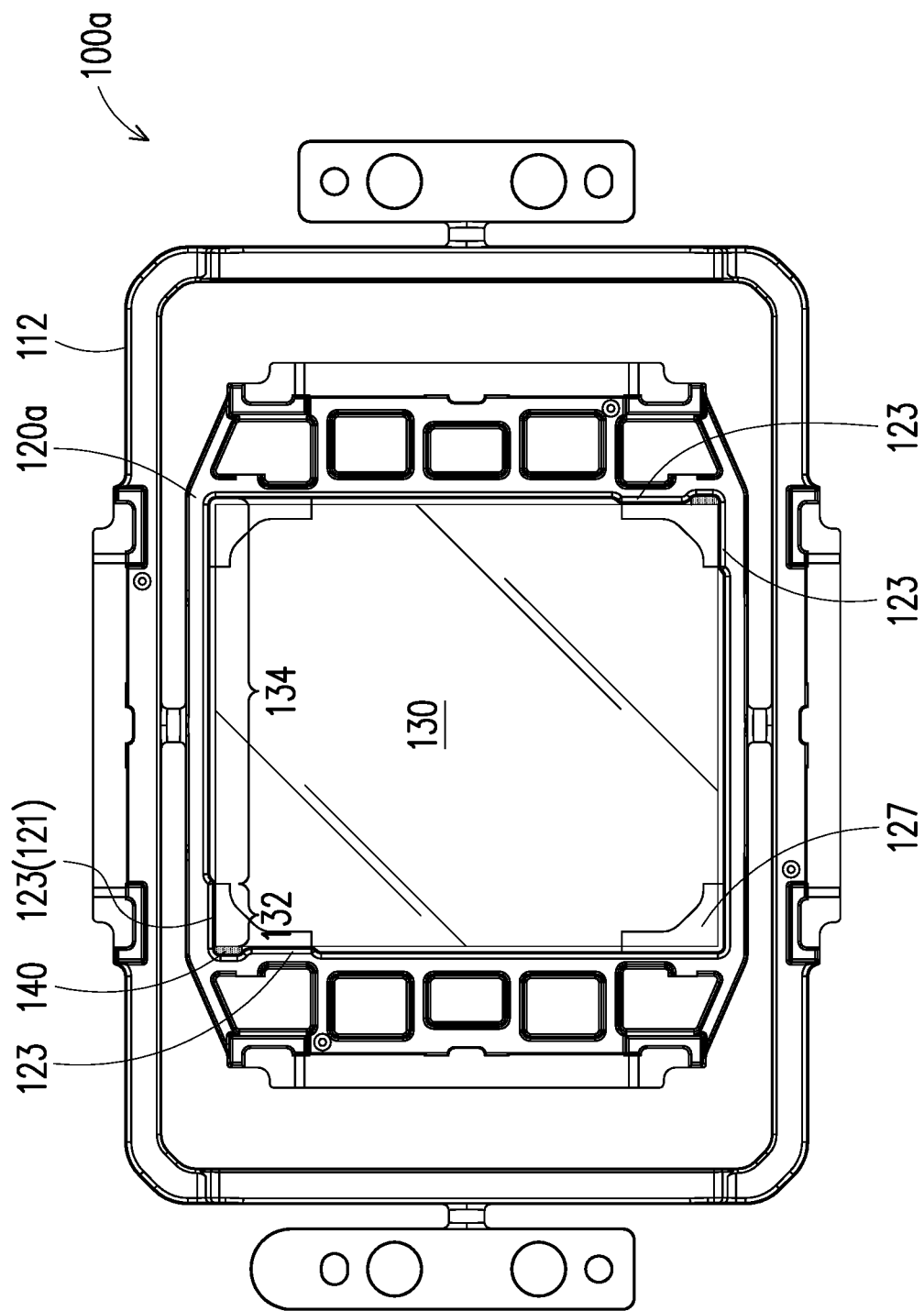
FIG. 3A to FIG. 3D are respectively schematic top views of optical devices according to other embodiments of the invention.

FIG. 3A to FIG. 3D are respectively schematic top views of optical devices according to other embodiments of the invention. Referring to FIG. 3A first, the main difference between an optical device 100a of the present embodiment and the optical device 100 of FIG. 1 lies in that, in the present embodiment, each of the first inner surfaces 121 has one limiting protruding portion 123, each of the first edges 131 includes one first segment 132, and the first segment 132 is aligned with the limiting protruding portion 123.

In the present embodiment, a first frame body 120a includes four limiting protruding portions 123 divided into two groups. The two limiting protruding portions 123 of one group are close to each other, and the two limiting protruding portions 123 of the other group are close to each other. Moreover, the two groups of the limiting protruding portions 123 are located at the diagonal positions of the first frame body 120a to provide excellent position limiting for the light-transmitting plate body 130 and reduce the possibility of movement of the light-transmitting plate body 130 with respect to the first frame body 120. Of course, in other embodiments, the relative positions of the limiting protruding portions 123 are not limited thereto.

Figure 3B:
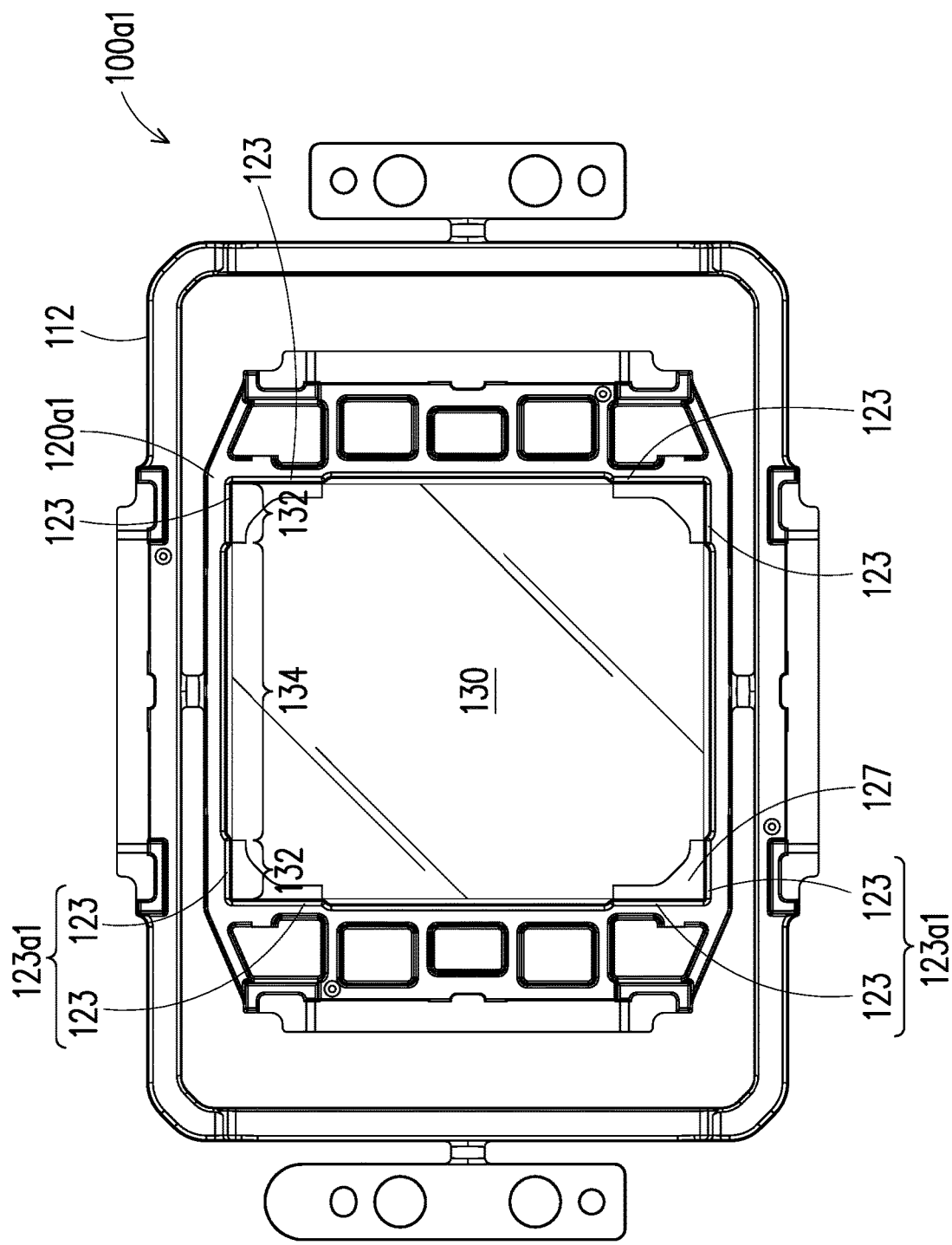

Referring to FIG. 3B, the main difference between an optical device 100a1 of the present embodiment and the optical device 100 of FIG. 1 lies in that, in the present embodiment, the two limiting protruding portions 123 aligned with at least one corner of the light-transmitting plate body 130 in a rectangular form are integrally formed into an L-shaped limiting protruding portion 123a1. In the present embodiment, the L-shaped limiting protruding portion 123a1 is located at the corner 122 (labeled in FIG. 2) of a first frame body 120a1. It is noted that, in other embodiments, the first frame body may also include the L-shaped limiting protruding portion 123a1 only at part of the corners 122. For example, at some of the four corners 122, the limiting protrusion portions may be integrally formed, and at others of the four corners 122, it is possible that the limiting protruding portions are not integrally formed. The invention is not limited to the illustration in FIG. 3B.

Figure 3C:
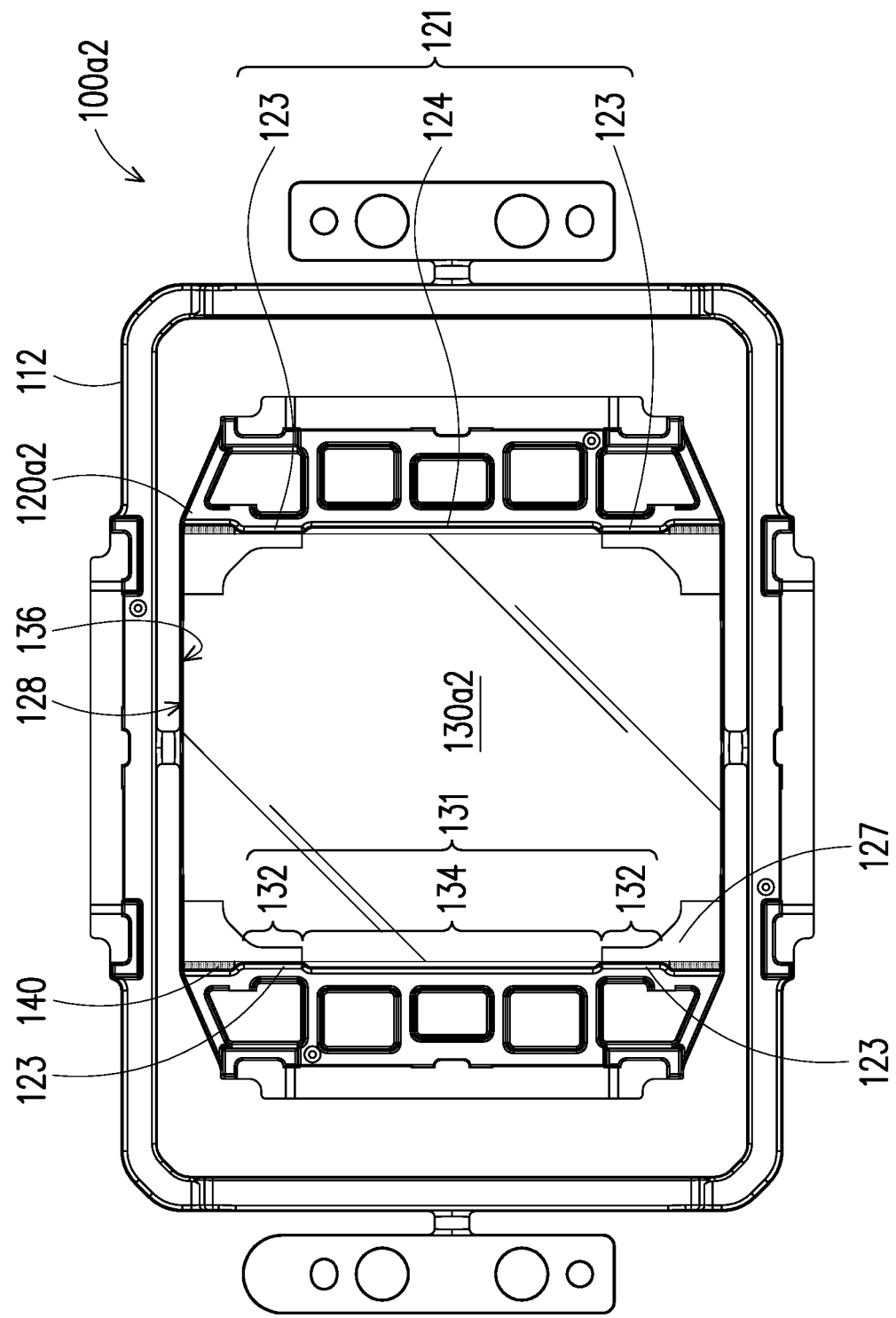

Referring to FIG. 3C, the main difference between an optical device 100a2 of the present embodiment and the optical device 100 of FIG. 1 lies in that, in the present embodiment, a first frame body 120a2 further has at least one second inner surface 128, and the at least one second inner surface 128 is a flat surface. The light-transmitting plate body 130 further includes at least one second edge 136, and the at least one second edge 136 is aligned with the at least one second inner surface 128 of the first frame body 120a2.

Specifically, in the present embodiment, the first frame body 120a2 has two first inner surfaces 121 and two second inner surfaces 128, and the first inner surfaces 121 and the second inner surfaces 128 are alternately adjacent to each other. The first inner surface 121 has the limiting protruding portions 123, and the second inner surface 128 does not have the limiting protruding portions 123. A light-transmitting plate body 130a2 includes two first edges 131 and two second edges 136. The two first edges 131 of the light-transmitting plate body 130a2 correspond to the two first inner surfaces 121 of the first frame body 120a2, and the two second edges 136 of the light-transmitting plate body 130a2 correspond to the two second inner surfaces 128 of the first frame body 120a2.

Figure 3D:
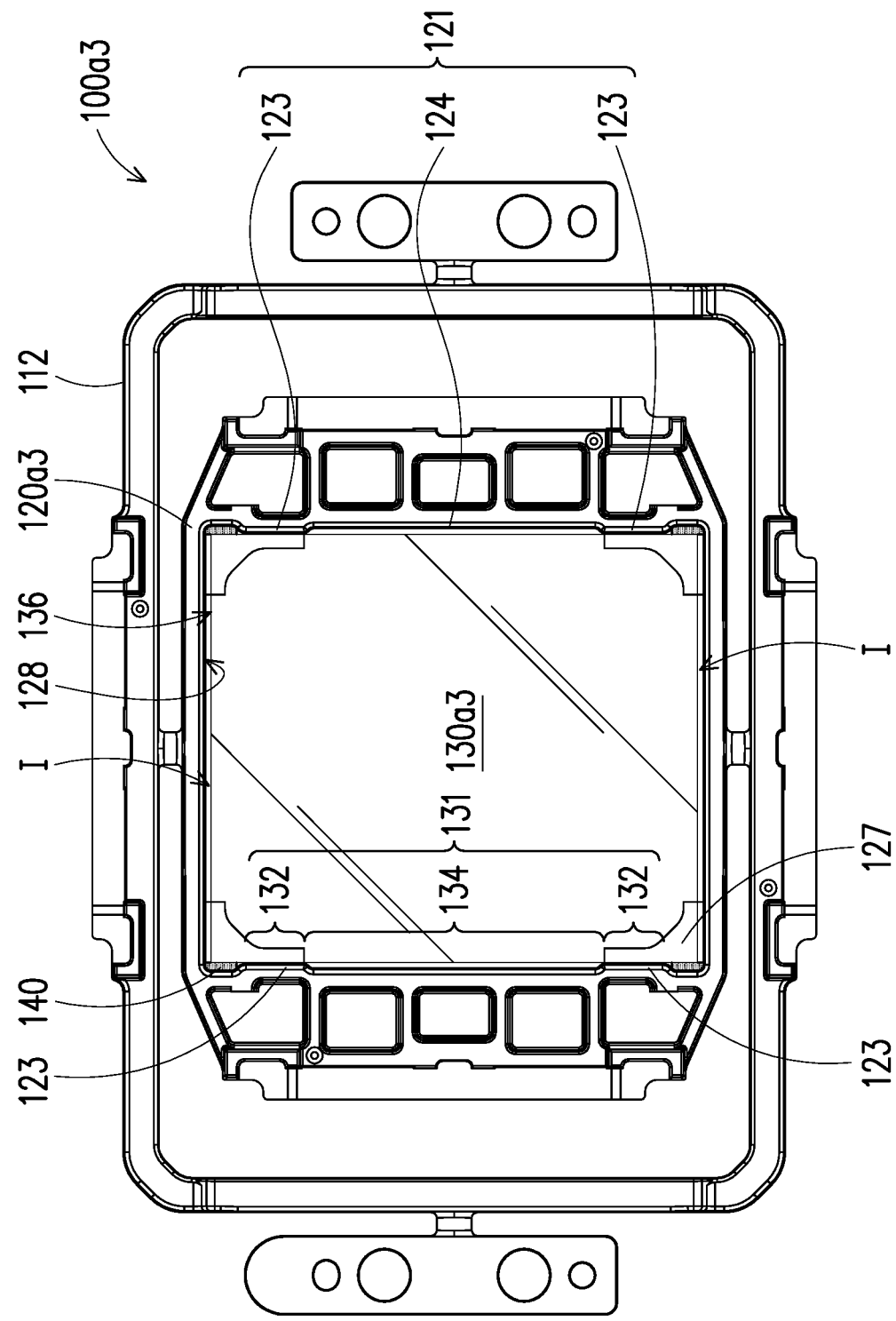

In the present embodiment, the second edges 136 are positioned through the second inner surfaces 128. For example, the second inner surfaces 128 of the first frame body 120a2 may be in contact with the second edges 136 of the light-transmitting plate body 130a2 to limit the position of the light-transmitting plate body 130a2. In other embodiments, an adhesive for bonding may also be present between the second inner surfaces 128 of the first frame body 120a2 and the second edges 136 of the light-transmitting plate body 130a2. However, the invention is not limited thereto. For example, in some embodiments, a gap I (as shown in FIG. 3D) may also be present between the second inner surfaces 128 of the first frame body 120a2 and the second edges 136 of the light-transmitting plate body 130a2. Further, in the present embodiment, the surface bearing portions 127 may also extend inwardly from the flat second inner surfaces 128.

Referring to FIG. 3D, the main difference between an optical device 100a3 of the present embodiment and the optical device 100a2 of FIG. 3C lies in that, in the present embodiment, the second inner surfaces 128 of a first frame body 120a3 are separated from the second edges 136 of a light-transmitting plate body 130a3, and a gap I is formed between the second inner surfaces 128 and the second edges 136 of the light-transmitting plate body 130a3.

Figure 4A:
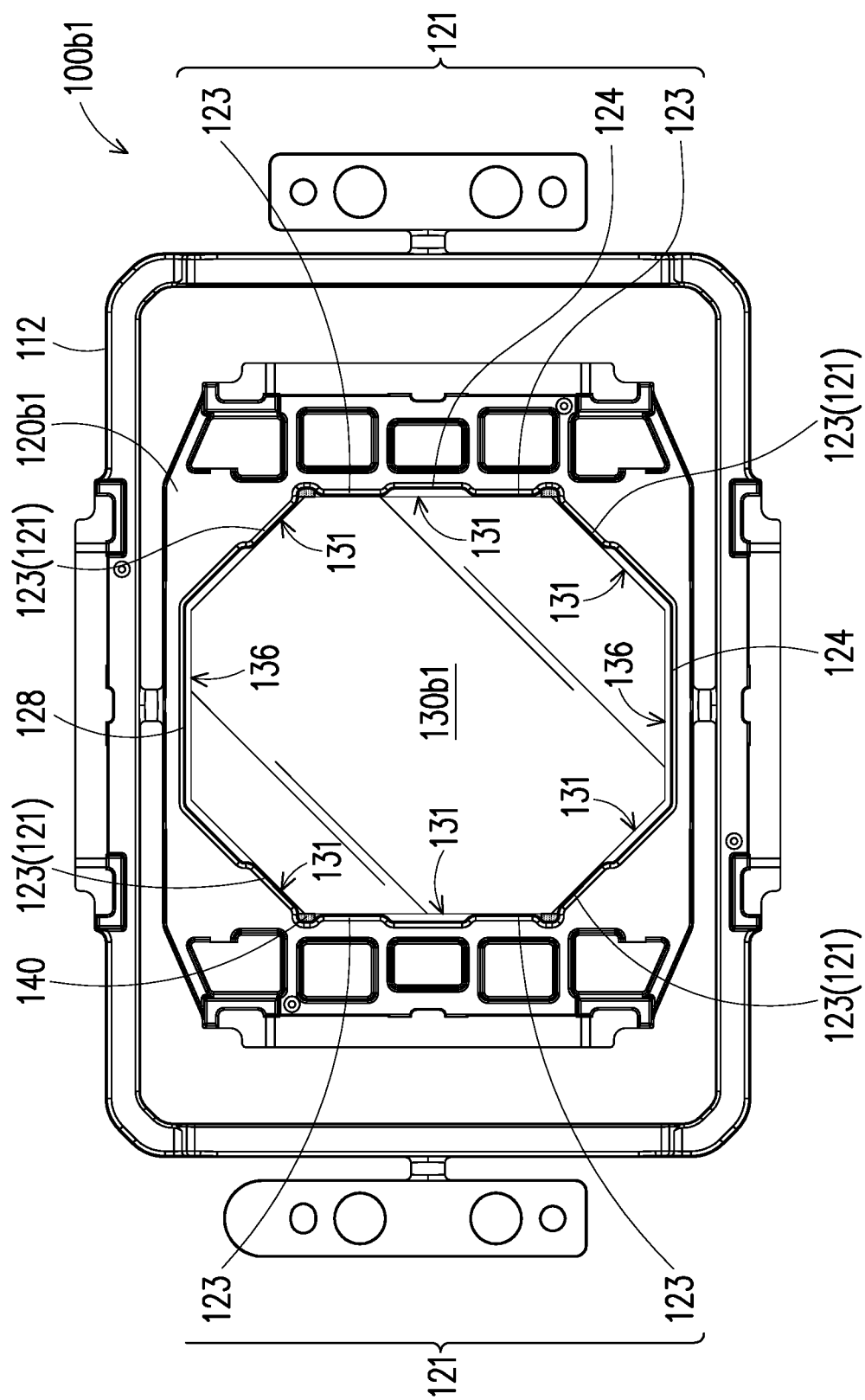
FIG. 4A to FIG. 4B are respectively schematic top views of optical devices according to other embodiments of the invention.
Figure 4B:
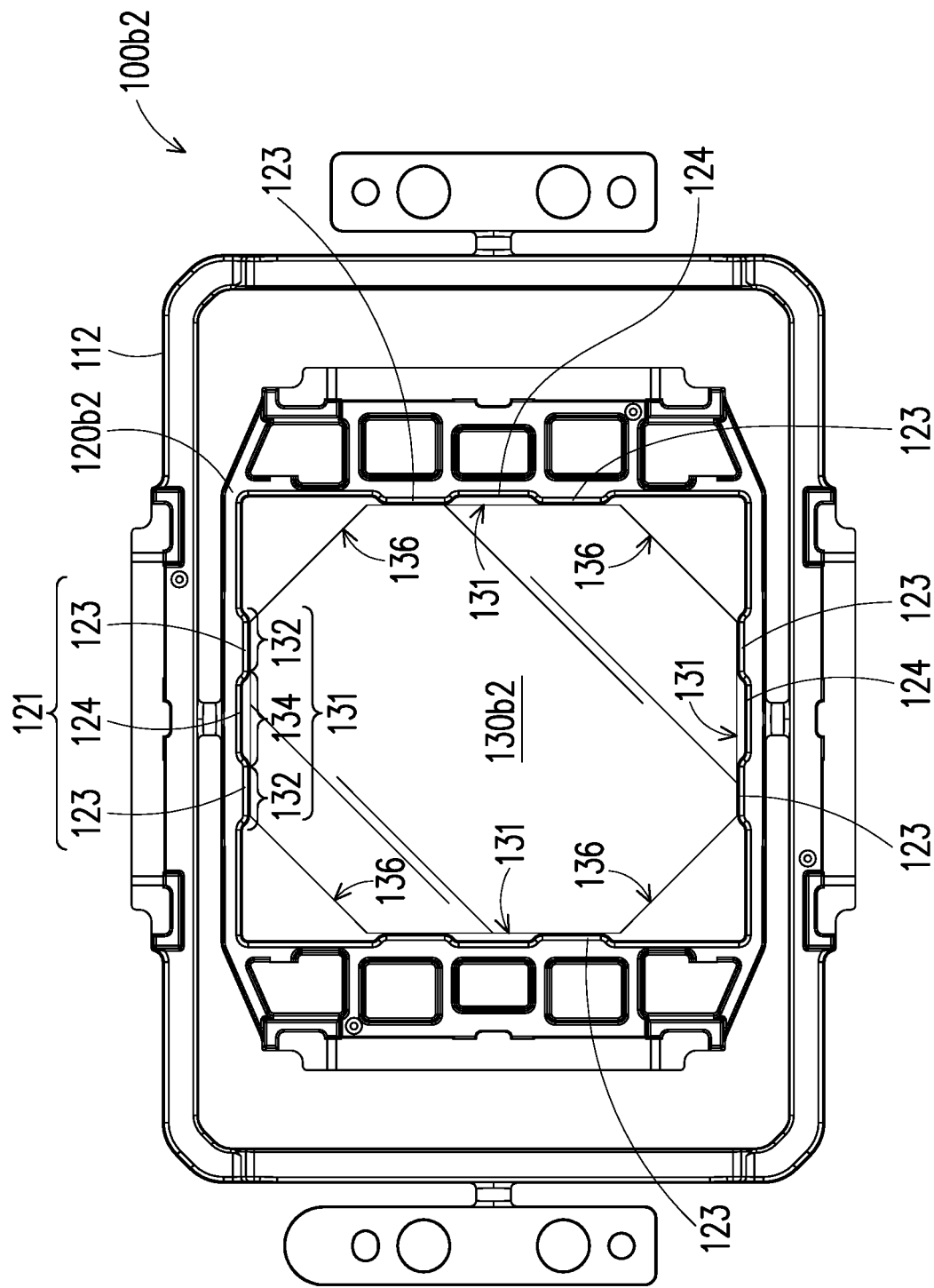

FIG. 4A to FIG. 4B are respectively schematic top views of optical devices according to other embodiments of the invention. Referring to FIG. 4A first, the main difference between an optical device 100b1 of the present embodiment and the optical device 100 of FIG. 1 lies in that, in the embodiment, the at least one first edge 131 and the at least one second edge 136 of a light-transmitting plate body 130b1 form an octagon. Further, the at least one first inner surface 121 and the at least one second inner surface 128 of the first frame body 120b1 also form an octagonal space corresponding to the light-transmitting plate body 130b1.

In the present embodiment, the light-transmitting plate body 130b1 has six first edges 131 and two second edges 136. More specifically, in the present embodiment, as can be seen from FIG. 4A, viewing clockwise starting from the 12 o'clock position, the edges of the light-transmitting plate body 130b1 are arranged in the sequence of one of the second edges 136, three of the first edges 131, the other one of the second edges 136, and the other three of the first edges 131, such that three of the six first edges 131 are located between the two second edges 136, and the other three of the six first edges 131 are located between the two second edges 136.

In the present embodiment, the first frame body 120b1 has six first inner surfaces 121 and two second inner surfaces 128. The first inner surface 121 has at least one limiting protruding portion 123, and the second inner surface 128 does not have a limiting protruding portion. More specifically, in the present embodiment, as can be seen from FIG. 4A, viewing clockwise starting from the 12 o'clock position, the inner surfaces of the first frame body 120b1 are arranged in the sequence of one of the second inner surfaces 128, a first inner surface 121 having one limiting protruding portion 123, a first inner surface 121 having two limiting protruding portions 123, a first inner surface 121 having one limiting protruding portion 123, the other one of the second inner surfaces 128, a first inner surface 121 having one limiting protruding portion 123, a first inner surface 121 having two limiting protruding portions 123, and a first inner surface 121 having one limiting protruding portion 123.

In the present embodiment, the first frame body 120b1 includes eight limiting protruding portions 123, and the limiting protruding portions 123 are concentrated at four of the corners 122 in the octagonal space. Of course, in other embodiments, the number and positions of the limiting protruding portions 123 of the first frame body 120b1 are not limited thereto.

Referring to FIG. 4B, the main difference between an optical device 100b2 of the present embodiment and the optical device 100b1 of FIG. 4A lies in that, in the present embodiment, an octagonal light-transmitting plate body 130b2 has four first edges 131 and four second edges 136, and each of the first edges 131 and each of the second edges 136 are sequentially alternately arranged. More specifically, in the present embodiment, as can be seen from FIG. 4B, viewing clockwise starting from the 12 o'clock position, the edges of the light-transmitting plate body 130b2 are arranged in the sequence of the first edge 131, the second edge 136, the first edge 131, the second edge 136, the first edge 131, the second edge 136, the first edge 131, and the second edge 136.

Further, in the present embodiment, the first frame body 120b2 has four first inner surfaces 121 that form a rectangular space, and each of the first inner surfaces 121 has two limiting protruding portions 123 to position the four first edges 131 of the light-transmitting plate body 130b2. In the present embodiment, each of the first inner surfaces 121 further has the side recess portion 124 between the two limiting protruding portions 123.

Figure 5:
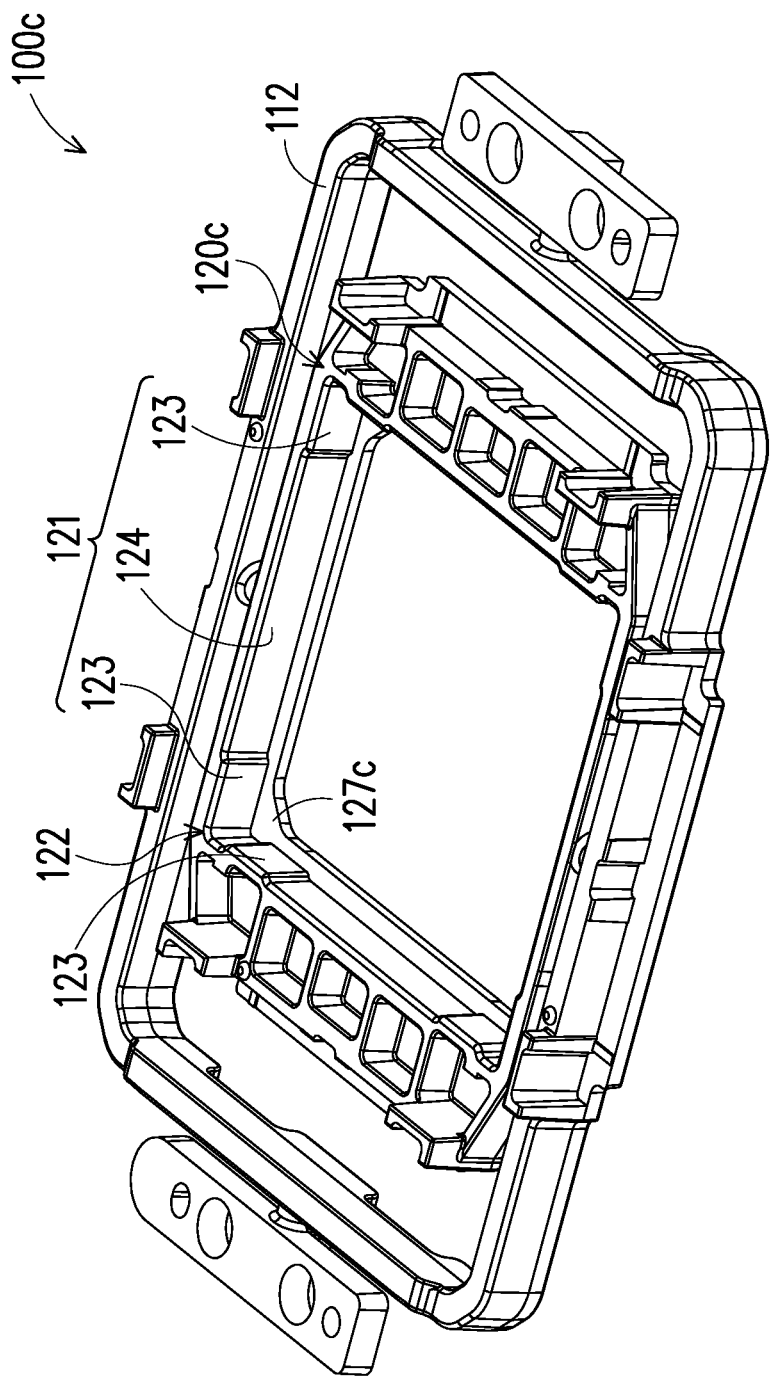
FIG. 5 is a schematic perspective view of a bearing structure of an optical device according to another embodiment of the invention.

FIG. 5 is a schematic perspective view of a bearing structure of an optical device according to another embodiment of the invention. Referring to FIG. 5, the main difference between an optical device 100c of the present embodiment and the optical device 100 of FIG. 2 lies in that, in the present embodiment, the number of a surface bearing portion 127c is one, and the surface bearing portion 127c is in an annular form and extends from the four first inner surfaces 121 of a first frame body 120c toward the center of the first frame body 120c. A part of the surface 138 (FIG. 2) of the light-transmitting plate body 130 that is close to the four edges is supported on the surface bearing portion 127c of the first frame body 120c, which can thus provide secure fixing effect.

Figure 6:
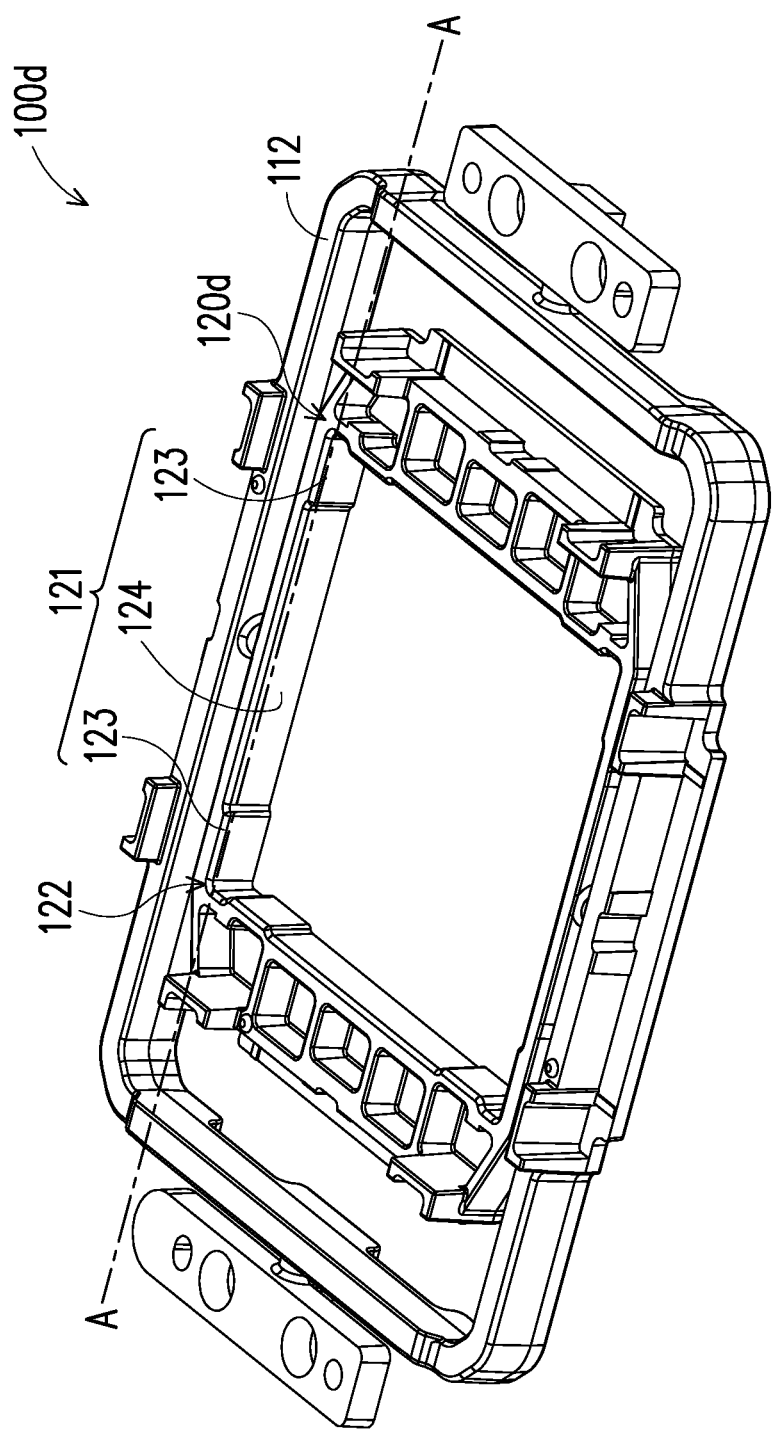
FIG. 6 is a schematic perspective view of a bearing structure of an optical device according to another embodiment of the invention.

FIG. 6 is a schematic perspective view of a bearing structure of an optical device according to another embodiment of the invention. Referring to FIG. 6, the main difference between an optical device 100d of the present embodiment and the optical device 100 of FIG. 2 lies in that, in the present embodiment, a first frame body 120d does not have a surface bearing portion. Therefore, the position of the light-transmitting plate body 130 (FIG. 2) disposed in the first frame body 120d may be closer to the inner-lower side of the first frame body 120d in the drawing. Since the configuration position of the light-transmitting plate body 130 may be different, in this configuration, the light-transmitting plate body 130 may be closer to other optical components (not shown) in a projector (not shown), such that the overall thickness can be reduced. It is noted that, in the present embodiment, the light-transmitting plate body 130 may be fixed to the first frame body 120 through adhesive-bonding, lock-fixing, pressing by an elastic piece, or another method. Even though the surface 138 (FIG. 2) of the light-transmitting plate body 130 is not supported on the surface bearing portions, the light-transmitting plate body 130 can still be properly fixed to the first frame body 120.

Figure 7:
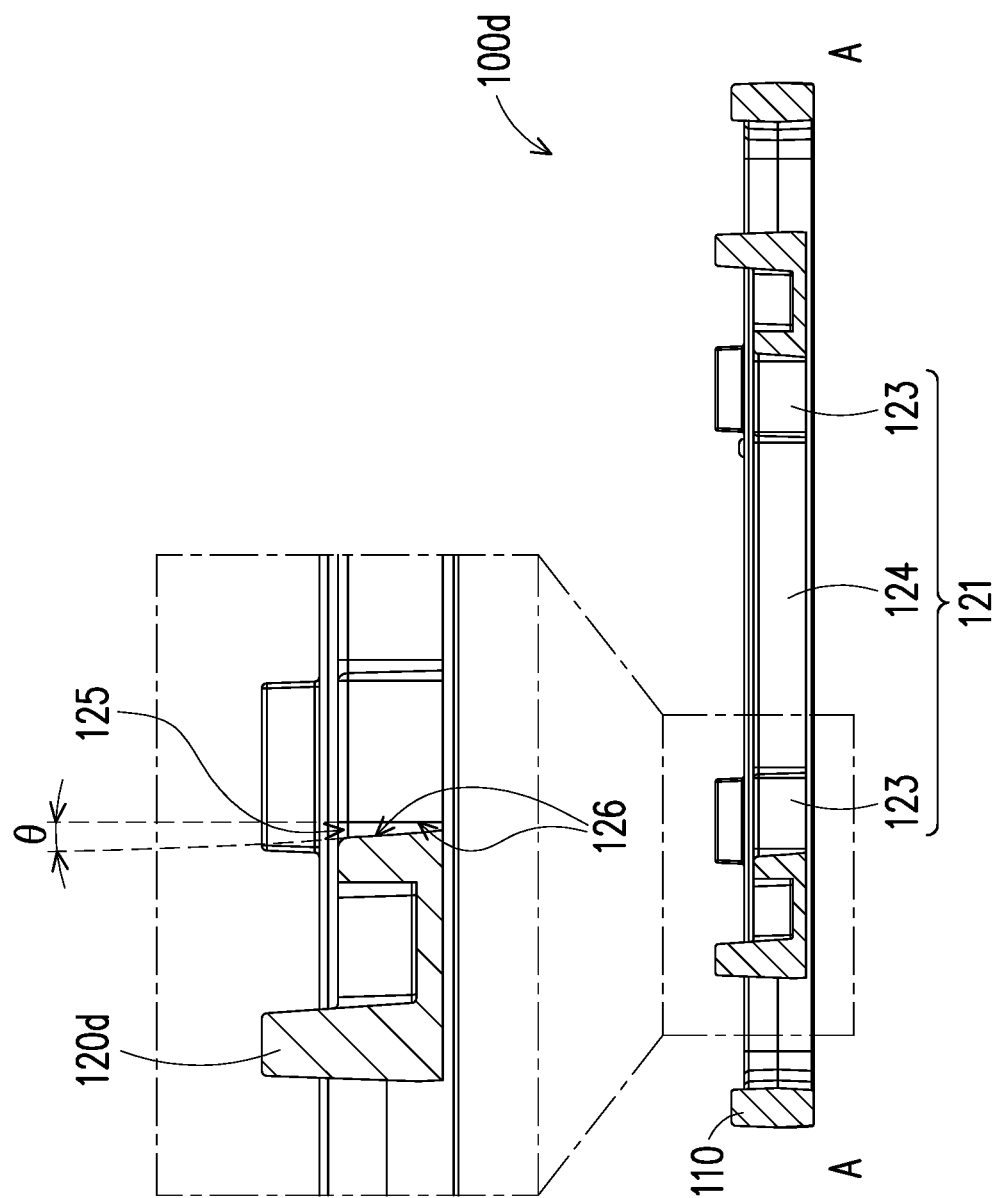
FIG. 7 is a schematic cross-sectional view of the bearing structure taken along line A-A in FIG. 6.

FIG. 7 is a schematic cross-sectional view of the bearing structure taken along line A-A in FIG. 6. Referring to FIG. 7, in the present embodiment, the first frame body 120d further has at least one third inner surface 126, and the at least one third inner surface 126 extends in a direction away from the center of the first frame body 120d (i.e., extending outward) to form at least one adhesive groove 125. In the present embodiment, the at least one adhesive groove 125 is formed at the corner 122 of the first frame body 120d, and the light-transmitting plate body 130 is bonded to the first frame body 120d through the adhesive 140 (FIG. 1) in the at least one adhesive groove 125.

In the present embodiment, the at least one third inner surface 126 includes a plurality of third inner surfaces 126, and two of the third inner surfaces 126 are adjacent to each other and form one of the adhesive grooves 125. As can be seen from FIG. 7, an included angle θ between the two adjacent third inner surfaces 126 is between 3 and 5 degrees. Generally, the draft angle of the first frame body 120 is about 2 to 3 degrees. In the present embodiment, the included angle θ between the two adjacent third inner surfaces 126 is greater than the draft angle for the sake of convenience for the process. Further, when the included angle θ between the two adjacent third inner surfaces 126 is between 3 and 5 degrees, the opening of the adhesive groove 125 may be slightly larger than the adhesive dispensing head to facilitate the adhesive dispensing operation. Of course, in other embodiments, the first frame body having the surface bearing portions may also have an adhesive groove, which is not limited to the illustration in the drawings.

In summary of the above, in the optical device of the invention, since the first frame body positions a part of the first edge of the light-transmitting plate body through the limiting protruding portion on the first inner surface rather than positions the entire first edge of the light-transmitting plate body through the entire first inner surface, the precision requirement for the first frame body may be lower, and an assembler may also operate more conveniently when assembling the light-transmitting plate body into the first frame body, which effectively avoids the assembly inconvenience resulting from the uneven surface of the frame body.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical device comprising a bearing structure and a light-transmitting plate body, wherein the bearing structure comprises a first frame body and a second frame body connected to each other, and the first frame body is located in the second frame body, wherein the first frame body has at least one first inner surface, and the at least one first inner surface has at least one limiting protruding portion protruding from the at least one first inner surface, and the light-transmitting plate body is disposed in the first frame body and is fixed to the first frame body, wherein the light-transmitting plate body has at least one first edge, and the at least one first edge of the light-transmitting plate body leans against the at least one limiting protruding portion so as to be positioned through the at least one limiting protruding portion, and the light-transmitting plate body and the first frame body move together, each of the at least one first edge comprises at least one first segment and at least one second segment, the at least one first segment is aligned with the at least one limiting protruding portion, and the at least one second segment is separated from the at least one first inner surface of the first frame body, each of the at least one first inner surface has two limiting protruding portions, and each of the at least one first edge comprises two first segments, wherein a side recess portion is formed between the two limiting protruding portions, and the side recess portion is aligned with the second segment between the two first segments, distances between the two first segments and the corresponding two limiting protruding portions are both smaller than a distance between the second segment and a bottom of the corresponding side recess portion.

2. The optical device according to claim 1, wherein a length of the at least one second segment is greater than a length of each of the first segments.

3. The optical device according to claim 1, wherein the light-transmitting plate body has four first edges, and the first frame body has at least four first inner surfaces.

4. The optical device according to claim 3, wherein the four first edges of the light-transmitting plate body form a rectangle, wherein at at least one corner of the rectangle, two limiting protruding portions respectively aligned with two adjacent first edges of the light-transmitting plate body are close to each other.

5. The optical device according to claim 3, wherein the four first edges of the light-transmitting plate body form a rectangle, wherein at at least one corner of the rectangle, two limiting protruding portions respectively aligned with two adjacent first edges of the light-transmitting plate body are integrally formed.

6. The optical device according to claim 1, wherein the first frame body further has at least one second inner surface, and the at least one second inner surface is a flat surface, wherein the light-transmitting plate body further comprises at least one second edge, and the at least one second edge is aligned with the at least one second inner surface of the first frame body.

7. The optical device according to claim 6, wherein the at least one second edge is positioned through the at least one second inner surface.

8. The optical device according to claim 6, wherein the at least one first edge and the at least one second edge of the light-transmitting plate body form an octagon.

9. The optical device according to claim 8, wherein the light-transmitting plate body has four first edges and four second edges, and each of the first edges and each of the second edges are sequentially alternately arranged.

10. The optical device according to claim 8, wherein the light-transmitting plate body has six first edges and two second edges, wherein three of the six first edges are located between the two second edges, and the other three of the six first edges are located between the two second edges.

11. The optical device according to claim 6, wherein the light-transmitting plate body has a surface, and the first frame body further has at least one surface bearing portion, wherein the at least one surface bearing portion extends from the at least one first inner surface or the at least one second inner surface of the first frame body toward a center of the first frame body, and the surface of the light-transmitting plate body is at least partially supported on the at least one surface bearing portion of the first frame body.

12. The optical device according to claim 11, wherein the at least one surface bearing portion is aligned with the at least one first segment of the at least one first edge.

13. The optical device according to claim 1, wherein the light-transmitting plate body has a surface, and the first frame body further has at least one surface bearing portion, wherein the at least one surface bearing portion extends from the at least one first inner surface or the at least one second inner surface of the first frame body toward a center of the first frame body, and the surface of the light-transmitting plate body is at least partially supported on the at least one surface bearing portion of the first frame body.

14. The optical device according to claim 13, wherein the at least one surface bearing portion is aligned with the at least one first segment of the at least one first edge.

15. The optical device according to claim 1, wherein the first frame body further has at least one third inner surface, wherein the at least one third inner surface extends in a direction away from a center of the first frame body and forms at least one adhesive groove, wherein the at least one adhesive groove is formed at a corner of the first frame body, and the light-transmitting plate body is bonded to the first frame body through an adhesive in the at least one adhesive groove.

16. An optical device comprising a bearing structure and a light-transmitting plate body, wherein
the bearing structure comprises a first frame body and a second frame body connected to each other, and the first frame body is located in the second frame body, wherein the first frame body has at least one first inner surface, and the at least one first inner surface has at least one limiting protruding portion protruding from the at least one first inner surface, and
the light-transmitting plate body is disposed in the first frame body and is fixed to the first frame body, wherein the light-transmitting plate body has at least one first edge, and the at least one first edge of the light-transmitting plate body is positioned through the at least one limiting protruding portion,
wherein the first frame body further has at least one third inner surface, wherein the at least one third inner surface extends in a direction away from a center of the first frame body and forms at least one adhesive groove, wherein the at least one adhesive groove is formed at a corner of the first frame body, and the light-transmitting plate body is bonded to the first frame body through an adhesive in the at least one adhesive groove,
wherein the at least one third inner surface comprises a plurality of third inner surfaces, two of the third inner surfaces are adjacent to each other and form the adhesive groove, and an included angle between the two adjacent third inner surfaces is between 3 and 5 degrees.

17. The optical device according to claim 15, wherein the at least one third inner surface comprises a plurality of third inner surfaces, two of the third inner surfaces are adjacent to each other and form the adhesive groove, and an included angle between the two adjacent third inner surfaces is between 3 and 5 degrees.

* * * * *